Oct. 6, 1959 S. STEINITZ 2,907,947
MAGNETIC AMPLIFIER APPARATUS
Filed May 2, 1956

INVENTOR.
STEPHAN STEINITZ
BY Clement J. Paznokas
ATTORNEY 2,907,947
Patented Oct. 6, 1959

2,907,947

MAGNETIC AMPLIFIER APPARATUS

Stephan Steinitz, St. Louis, Mo., assignor to Vickers Incorporated, Detroit, Mich., a corporation of Michigan Application May 2, 1956, Serial No. 582,186
12 Claims. (Cl. 323—89)

Figure 1:
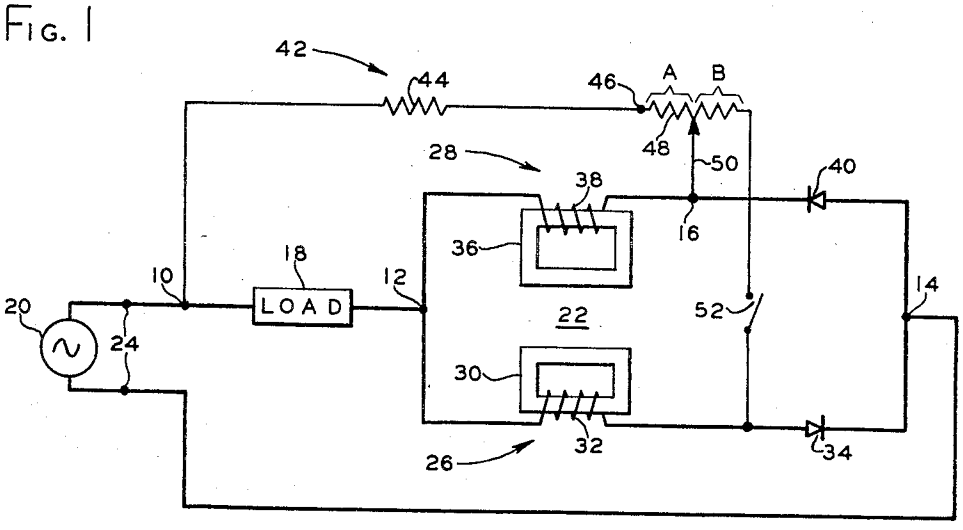

This invention relates to power transmission and more particularly to self-saturating magnetic amplifiers.

Self-saturating magnetic amplifiers are characterized by saturable-core reactor load windings which carry a direct current component to provide a desired threshold of premagnetization. Usually this type of amplifier is controlled by auxiliary control windings carrying either unidirectional current or properly phased alternating current.

The present invention contemplates a self-saturating magnetic amplifier whose output may be controlled through a considerable range without auxiliary control windings, although such windings may be used in addition if desired. Such an arrangement requires less core window space for given power requirement and less copper, thus realizing important economies, both in cost and in space.

In accordance with one embodiment of the invention, the output of a self-saturating magnetic amplifier may be controlled by supplying, from the power supply source of the amplifier, saturating current to the reactor power winding of a self-saturating magnetic amplifier during the inactive period of the saturating rectifier which is connected in series with the power winding.

A further feature of the invention is the supplying of saturating current and desaturating current from the supply source to the power winding during the inactive period of the saturating rectifier, and oppositely and simultaneously affecting the amplitudes of these respective currents with a single control.

It is therefore an object of the present invention to provide a new, useful and more economically constructed self-saturating magnetic amplifier.

Another object of the present invention is a self-saturating magnetic amplifier which may be controlled through a considerable range without auxiliary control windings. This does not preclude the use of auxiliary control windings if they are desired in addition to the control effected by use of the present invention alone.

Further objects and advantages of the present invention will be apparent from the following description, reference being had to the accompanying drawing wherein a preferred form of the present invention is clearly shown.

Figure 2:
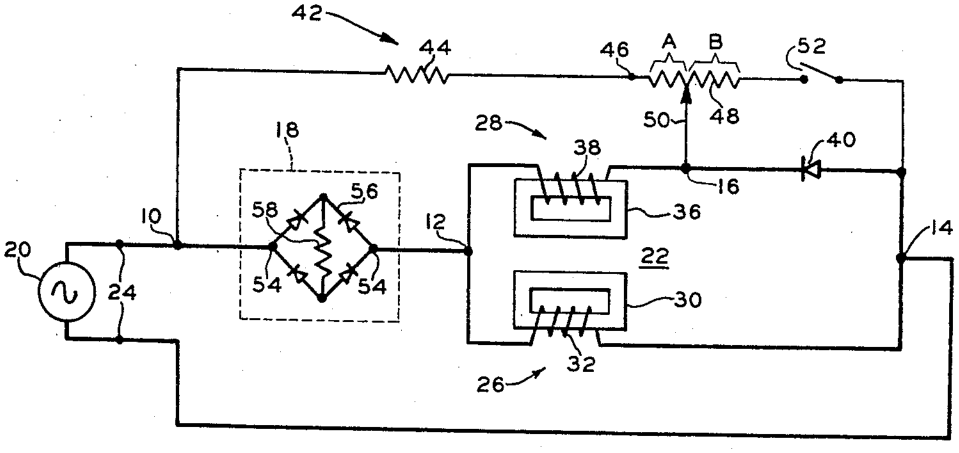

In the drawing:

Fig. 1 is a schematic diagram of the present invention embodied in one type of a doubler self-saturating magnetic amplifier; and Fig. 2 is a schematic diagram of the invention embodied in another type of a doubler self-saturating magnetic amplifier.

For convenience, the diagram in Fig. 1 is provided with circuit reference points 10, 12, 14 and 16. The circuit shown in this figure includes: a load 18 between circuit points 10 and 12; an alternating current power supply source 20; and a self-saturating magnetic amplifier 22, through which the load 18 is supplied with power from the power source 20. The amplifier and load are connected to the power source through power input terminals 24, which are connected to circuit points 10 and 14.

Included in amplifier 22 are a pair of reactor branches 26 and 28 connected in parallel between circuit points 12 and 14, each branch being provided with a saturable-core reactor with a power winding in series with a unidirectional device, which device may be a metallic rectifier such as a selenium or germanium cell. Thus, branch 26 has a saturable-core reactor 30 with a power winding 32 in series with a half-wave rectifier 34, while branch 28 has a saturable-core reactor 36 with a power winding 38 in series with a half-wave rectifier 40. In the connection shown the rectifiers 34 and 40 not only operate on alternate half cycles of the supply voltage applied across the amplifier, but they are also oppositely poled in order to supply the load with alternating current. Thus, with respect to the load and to the supply voltage the rectifiers 34 and 40 are reversely related to each other. The particular connections and relations thus far described form the conventional doubler self-saturating magnetic amplifier which is characterized by two parallel reactor branches which alternately operate on opposite half cycles of the applied alternating supply voltage to furnish current to the output circuit in opposite directions resulting in an alternating current output.

Current flowing through a reactor power winding in the conductive direction of its associated series rectifier is referred to herein as saturating current, and its direction as the saturating direction. This terminology shall be adhered to whether the current flows through the rectifier or not. Current through the power winding in the opposite direction is referred to herein as desaturating current and its direction as the desaturating direction. The particular half cycles of the applied alternating current supply voltage during which a rectifier conducts are referred to as its active or conductive period or half cycle. It should be understood that a unidirectional device such as a rectifier may have leakage in the opposite direction to its conductive direction and still be referred to as being unidirectional.

That end of the load nearest a power input terminal is referred to herein as the supply-terminal end of the load. Also, that end of a reactor power winding nearest the load is referred to herein as the load end of the power winding. For example, in Fig. 1 the load end of power winding 36 is that end connected to circuit point 12.

With the components described thus far the circuit of Fig. 1 will have what may be called a quiescent output which may be relatively low or high, depending upon the circuit parameters. The quiescent level may be set by inherent design or by adding bias. Thus the quiescent value may assume any value within the capabilities of the reactors, including cut-off, the latter case providing the widest range of control influence by saturating current furnished by the hereinafter described circuit link.

In order to drive the output of the amplifier above the quiescent level, current from the supply source 20 is supplied to the power winding 38 in a saturating direction during the non-conducting or inactive half cycle of the rectifier 40 by means of a circuit link connecting the supply-terminal end of the load to a circuit point in branch 28 between the load end of the power winding 38 and the rectifier 40. In the specific embodiment shown in Fig. 1 the supply-terminal end of the load is a circuit point 10, while the circuit point between the load end of the power winding 38 and the rectifier 40 is indicated at 16, although it may be elsewhere in the branch within the location limits prescribed, for example, it may be a tap on the power winding 38.

The circuit link itself is indicated at 42 and includes sufficient resistance or impedance to prevent the shunting of an excessively undesirable current portion around the reactor winding 38 and the load 18. The choice of the value of resistance in the link will be governed by the conditions which can be tolerated in the particular instance under consideration. The greater the resistance the lesser will be both the shunting effect and the amount of saturating current which will flow through the power winding 38 by way of the link during the inactive period of rectifier 40. The contrary will be true as the resistance is decreased, thus, the lower the resistance in the circuit link 42, the greater will be the saturating current which will flow through the power winding 38 and also the greater will be the shunting effect of the circuit link 42 around the load and the power winding 38. A compromise has to be chosen to fit the particular occasion. In the embodiment shown a fixed resistor 44 insures a certain minimum value of resistance in the circuit link 42. Additionally, an adjustable resistor is included in the circuit link 42 in the form of the portion A between one end 46 of potentiometer 48 and its contact arm 50, the latter being connected to circuit point 16. Portion A of the potentiometer 48 is that portion of its resistance element which extends from the end 46 to the contact arm 50 at any given adjustment. Thus for any given position of potentiometer arm 50, the circuit link 42 will have a finite resistance composed of the value of resistor 44 and that of potentiometer portion B, which finite resistance may be adjusted in value by moving the contact arm 50. The term "finite resistance" as used herein means any value of resistance between zero and infinity. A switch 52 when closed connects the portion B of the potentiometer to a circuit point between the power winding 32 and the rectifier 34 in branch 26. With the switch 52 open as shown, the portion B is not in any circuit. In the embodiment shown the circuit link 42 is in series with the power winding 38 in a current path connected directly across the load at circuit points 10 and 12.

For descriptive convenience it will be assumed that the arrowhead portions of the rectifier symbols point in the conductive direction of the rectifiers and that the rectifiers are conductive when the arrowhead portion of the symbol is connected to the positive side of the supply voltage. Thus, when circuit point 14 is positive rectifier 40 will be conductive and when circuit point 12 is positive rectifier 34 will be conductive.

With switch 52 open, the operative currents may be traced as follows. When the supply voltage is positive at circuit point 14, rectifier 34 blocks current flow while rectifier 40 passes current through the load 18 through power winding 38. Depending on the resistance in circuit link 42, some current will also pass through this link which shunts power winding 38 and the load 18. On the next half cycle of the supply voltage the circuit point 10 is positive and rectifier 34 will allow current flow through the load 18 in the opposite direction, while rectifier 40 will block current flow. During this half cycle, current from the supply source 20 will also flow through circuit point 10, the circuit link 42, circuit point 16, through power winding 38, joining the load current at circuit point 12, and thence through power winding 32, rectifier 34, and circuit point 14 to the source 20. It will be noted that this current flow through power winding 38 by way of circuit link 42 is in the saturating direction, and the mmfs generated thereby in the reactor 36 will be in the aiding direction with respect to mmfs generated in the reactor 36 by load current conduction through rectifier 40 when that rectifier is conducting.

The amount of saturating current which will be supplied to power winding 38 through circuit link 42 will depend on the resistance of the circuit link which may be varied by adjusting the potentiometer contact arm 50. The load current output of the reactor 36 will be dependent upon the amount of saturating current which will flow therethrough. I have found that although there is no direct control applied to reactor 30, branch 26, being in parallel with branch 28, will with respect to its output above quiescent values follow that of branch 28 with a form of "slave action." Thus, adjusting the load current output of reactor 36 will also control the output of reactor 30. Within the range of values above the quiescent level, the output of reactor 30 will be reduced when the output of reactor 36 is reduced by controlling its saturation. Likewise, if the output of reactor 36 is increased by controlling its saturation, the output of reactor 30 will follow and also increase. The theory of this action is related to the fact that the portion of the supply voltage across the reactor branch 28 is the same as that across reactor branch 26, and also that a reactor can discharge or dissipate during one half cycle, only the volt-seconds absorbed by it in the previous half cycle.

In order to drive the output of the amplifier downward from the quiescent level, current in the desaturating direction is supplied from the power source 20 to the respective reactors 36 and 30 during the nonconductive or inactive periods of their respective series rectifiers. This is accomplished in the embodiment shown by connecting resistance in the form of portion B of the potentiometer 48 between circuit point 16 and a circuit point between the power winding 32 and rectifier 34 by throwing the switch 52 and closing the circuit thereat.

With switch 52 closed, potentiometer portion B forms a shunt or bypass for the load current around each of the rectifiers 34 and 40 during their respective inactive periods, thus allowing current from the supply source 20 to pass through the reactor power winding associated with a particular rectifier in a desaturating direction during the inactive period of that rectifier. More specifically, when the supply voltage is positive at circuit point 14 rectifier 34 is nonconductive and blocks load current flow, while rectifier 40 is conductive and passes current to the load 18 through two parallel paths dividing at circuit point 16 and joining at circuit point 12. The main path includes power winding 38, while the other path includes the potentiometer portion B and power winding 32. During this half cycle the inactive rectifier 34 is shunted or bypassed by the potentiometer portion B through the active rectifier 40. The current passed through power winding 32 by rectifier 40 during this half cycle is in the desaturating direction. Conversely, on the next half cycle when the supply voltage is positive at circuit point 10, rectifier 40 is inactive and blocks current flow, while rectifier 34 is active and allows load current to flow through circuit point 12, through power winding 32, rectifier 34, to circuit point 14, and also permits current flow in the desaturating direction from point 12 through power winding 38, potentiometer portion B and rectifier 34 to point 14. Thus, during this half cycle, potentiometer portion B is shunted around the inactive rectifier 40, permitting current flow through power winding 38 in the desaturating direction.

By adjusting potentiometer contact arm 50 the resistances of portions A and B may be simultaneously oppositely changed, that is, while the resistance of one is increased, the resistance of the other is decreased, thus adjusting in opposite sense the superposed saturating and desaturating currents flowing through the power winding 38 during the inactive period of rectifier 40; one is lowered while the other is simultaneously raised. The resultant of the superposed saturating and desaturating currents will be either in the saturating or desaturating direction depending on which of the two superposed currents predominates. This provides a wide range of control of the amplifier output.

In Fig. 2 the invention is employed in connection with another type of doubler self-saturating magnetic amplifier. In this figure parts corresponding with those in Fig. 1 carry the same reference numerals. The chief difference between the circuits of Figs. 1 and 2 is that in Fig. 2 one parallel reactor branch of the doubler amplifier is minus a rectifier. Specifically, branch 26 does not have a series rectifier. Despite the fact that only one of the parallel reactor branches has a series rectifier therein, the circuit functions as a self-saturating magnetic amplifier and produces an A.C. output that very closely corresponds to that of the output of the circuit in Fig. 1. For example, it supplies alternating current to its illustrated load, the input terminals 54 of a full-wave rectifier 56 whose output terminals are connected to a direct current load 58. In the circuit of Fig. 2 the circuit link 42 operates as previously described herein to supply saturating current to the power winding 38 during the inactive half cycle of rectifier 40. Likewise, in this figure potentiometer portion B may be shunted across rectifier 40 by closing switch 52, thereby supplying current from the power source 20 in the desaturating direction through power winding 38 during the nonconductive period of rectifier 40. Because of the slave-like tracking the output of branch 26 in Fig. 2 will follow the output of branch 28 as the latter is adjusted by means of the potentiometer 48.

In particular examples of the circuits described herein the load 18 was constituted by a 200 watt, 110 volt lamp load; the supply source 20 was 120 volts, 60 cycles; resistor 44 was 3000 ohms, 10 watt capacity, and the resistance of potentiometer 48 was 10,000 ohms with a 2 watt capacity and a B taper flat at the end connected to switch 52. Moving the potentiometer contact arm 50 from left to right dimmed the lamp load and moving it from right to left brightened the lamp load.

While the form of embodiment of the invention as herein disclosed constitutes a preferred form, it is to be understood that other forms might be adopted, all coming within the scope of the claims which follow.

What is claimed is as follows:

1. Magnetic amplifier apparatus comprising first, second, third and fourth circuit points, a load connected between the first and second points, a pair of parallel branches connected between the second and third points, each branch including a saturable reactor power winding, the fourth point being in one of said branches and the power winding in that branch being connected between the second and fourth points, a unidirectional device connected between the fourth and third points and poled to block load current flow in the direction from the fourth to the third point, and a circuit link including finite resistance connecting the first and fourth points, said apparatus being operable in response to the application of alternating voltage across the first and third points.

2. Magnetic amplifier apparatus comprising first, second, third and fourth circuit points, a load connected between the first and second points, a pair of parallel branches connected between the second and third points, each branch including a saturable reactor power winding, the fourth point being in one of said branches and the power winding in that branch being connected between the second and fourth points, a unidirectional device connected between the fourth and third points and poled to block load current flow through said one branch in the direction from the second to the third points, the other branch being conductive at least in the direction from the second point to the third point, and a circuit link including finite resistance connecting the first and fourth points, said apparatus being operable in response to the application of alternating voltage across the first and third points.

3. Magnetic amplifier apparatus comprising an input circuit for receiving electric power, a load, a doubler self-saturating magnetic amplifier, said load being connected between said input circuit and said amplifier, said amplifier having two parallel reactor branches, each including a saturable reactor power winding, at least one branch having a unidirectional device connected to the end of the power winding furthest removed from the load, the device in said one branch being poled to pass current through said one branch and the load in the direction from the device through the winding of that branch toward the load, and a circuit link including finite resistance connected between the input side of the load and a point in said one branch between the load end of its power winding and the unidirectional device.

4. Magnetic amplifier apparatus comprising first and second input terminals for receiving alternating voltage, a pair of saturable reactor branches, one end of each being coupled to said second terminal, load means connected between said first terminal and the other ends of said branches, each of said branches having a saturable reactor power winding connected in series therein, at least one of said branches having a unidirectional device connected therein in series with the power winding in that branch, and means for supplying current to the power winding of said one branch in the saturating direction during the nonconducting period of the device in that branch in response to alternating voltages applied across said input terminals.

5. Magnetic amplifier apparatus comprising first and second input terminals for receiving alternating voltage, a pair of saturable reactor branches, one end of each being coupled to said second terminal, load means connected between said first terminal and the other ends of said branches, each of said branches having a saturable reactor power winding connected in series therein, a unidirectional device connected in one of said branches in series therein between the power winding in that branch and the second terminal and poled to block current flow in the direction from the first input terminal toward the second input terminal through the device, and means for passing current through the power winding of said one branch in the saturating direction during the nonconducting period of said device in response to alternating voltages applied across said input terminals, the latter means comprising a current path in parallel with said load means and including the latter power winding and a finite resistance in series therewith, said resistance being outside of said branches.

6. Magnetic amplifier apparatus comprising first and second input terminals for receiving alternating voltage, a pair of saturable reactor branches, one end of each being coupled to said second terminal, load means connected between said first terminal and the other ends of said branches, that end of the load means which is nearest to the first terminal being referred to as the terminal end of the load means, each of said branches having a saturable reactor power winding connected in series therein, at least one of said branches having therein a unidirectional device connected in series with the power winding of that branch, the unidirectional device in said one branch being between the power winding in that branch and the second terminal and poled to block current flow from the first input terminal through the device to the second input terminal, that end of the latter power winding which is nearest the load means being referred to as the load end of the power winding, and means for passing current through the power winding of said one branch in the saturating direction during the nonconducting period of said device in response to alternating voltages applied across said input terminals, the latter means comprising a circuit link including impedance means connecting the terminal end of the load means to a circuit point in said one branch between said device and the load end of the latter power winding.

7. Magnetic amplifier apparatus comprising first and second input terminals for receiving alternating voltage, a pair of saturable reactor branches, one end of each being coupled to said second terminal, load means connected between said first terminal and the other ends of said branches, each of said branches having a saturable reactor power winding connected in series therein, at least one of said branches having connected therein a unidirectional device in series with the power winding in that branch, means for passing a saturating component of current through the power winding of said one branch during the nonconducting period of the device in that branch in response to alternating voltages applied across said input terminals, and means for passing a desaturating component of current through the latter winding during said period.

8. Magnetic amplifier apparatus comprising first and second input terminals for receiving alternating voltage, a pair of saturable reactor branches, one end of each being coupled to said second terminal, load means connected between said first terminal and the other ends of said branches, each of said branches having a saturable reactor power winding connected in series therein, at least one of said branches having a unidirectional device connected therein in series with the power winding in that branch, means for passing a saturating component of current through the power winding of said one branch during the nonconducting period of the device in said one branch in response to alternating voltages applied across said input terminals, means for passing a desaturating component of current through the latter winding during said period, and single control means for oppositely affecting the amplitudes of said respective current components in opposite sense.

9. Magnetic amplifier apparatus comprising first and second input terminals for receiving alternating voltage, a pair of saturable reactor branches, one end of each being coupled to said second terminal, load means connected between said first terminal and the other ends of said branches, that end of the load means which is nearest to the first terminal being referred to as the terminal end of the load means, each of said branches having a saturable reactor power winding connected in series therein, a unidirectional device connected in one of said branches in series therein between the power winding in that branch and the second terminal and poled to block current flow in the direction from the first input terminal toward the second input terminal, that end of the latter power winding which is nearest the load means being referred to as the load end of the power winding, a current path including finite resistance connecting the terminal end of the load means to a circuit point in said one branch between said device and the load end of the latter power winding, and a current path including finite resistance connected across said device.

10. Magnetic amplifier apparatus comprising first and second input terminals for receiving alternating voltage, a pair of saturable reactor branches, one end of each being coupled to said second terminal, load means connected between said first terminal and the other ends of said branches, that end of the load means which is nearest to the first terminal being referred to as the terminal end of the load means, each of said branches having a saturable reactor power winding connected in series therein, a unidirectional device connected in one of said branches in series therein between the power winding in that branch and the second terminal and poled to block current flow through the device in the direction from the first input terminal toward the second input terminal, that end of the latter power winding which is nearest the load means being referred to as the load end of the power winding, a current path including finite resistance connecting the terminal end of the load means to a circuit point in said one branch between said device and the load end of the latter power winding, a current path including finite resistance shunting said device at least during its nonconducting period, and single control means for simultaneously increasing the resistance in one of said current paths while decreasing the resistance in the other current path.

11. Electric apparatus comprising a load, a self-saturating magnetic amplifier, a source of alternating current connected to supply power to the load through the amplifier, said amplifier having two alternately operable reactor branches, each including a saturable reactor power winding, at least one branch having a unidirectional device connected therein in series with the power winding of that branch, and means for supplying saturating current from said source to the latter power winding during the inactive period of the device in said one branch, said means including a path conductively connected to the latter power winding and along which path said saturating current flows from the power source to the winding.

12. Electric apparatus comprising a load, a self-saturating magnetic amplifier, a source of alternating current connected to supply power to the load through the amplifier, said amplifier having two alternately operable reactor branches, each including a saturable reactor power winding, at least one branch having a unidirectional device connected therein in series with the power winding of that branch, means for supplying a current component from said source to the latter power winding in the saturating direction during the inactive period of the device in said one branch, means for supplying a current component from said source to the latter winding in the desaturating direction during said period, and single control means for oppositely affecting the amplitudes of said respective current components.

References Cited in the file of this patent

UNITED STATES PATENTS

| | | |
|---|---|---|
| 1,997,179 | Logan | Apr. 9, 1935 |
| 2,126,790 | Logan | Aug. 16, 1938 |
| 2,733,307 | Ogle | Jan. 31, 1956 |
| 2,760,148 | Sakamoto | Aug. 21, 1956 |
| 2,800,626 | Bastian | July 23, 1957 |
| 2,843,818 | Mintz et al. | July 15, 1958 |